United States Patent [19]

Roels et al.

[11] Patent Number: 4,963,446
[45] Date of Patent: Oct. 16, 1990

[54] INWARDLY INDENTED EDGE ELECTRODE ASSEMBLY

[75] Inventors: Timothy J. Roels, Rocky River; Jeannine L. Affeldt, Avon Lake, both of Ohio

[73] Assignee: Eveready Battery Co., Inc., St. Louis, Mo.

[21] Appl. No.: 333,602

[22] Filed: Apr. 5, 1989

[51] Int. Cl.⁵ .............................................. H01M 6/10
[52] U.S. Cl. ...................................... 429/94; 29/623.1
[58] Field of Search ........................... 429/94; 29/623.1

[56] References Cited
U.S. PATENT DOCUMENTS 3,695,935 10/1972 Cromer ................................... 429/94
4,529,675 7/1985 Sugalski .................................. 429/94

FOREIGN PATENT DOCUMENTS 1415519 12/1965 France ................................... 429/94

Primary Examiner—Donald L. Walton
Attorney, Agent, or Firm—Virgil B. Hill

[57]      ABSTRACT

Protruding exposed edges of the foil carrier of an electrode in a jelly roll cell are specially indented inwardly at intervals to facilitate placement of an insulator ring at the top of the cell after insertion of the electrode in the container. Effective insulation of the exposed carrier edges from the container wall and good continuity of contact to the pressure contact means are achieved by the radial indenting of the axial ends of the exposed foil edges toward the axial center at intervals on at least a significant number of the outer turns of the foil coil to form sloped valllues and intermediate sloped ridges between said valleys, said outermost turns of the foil edges being pushed together at said valleys and spaced at said ridges.

19 Claims, 2 Drawing Sheets

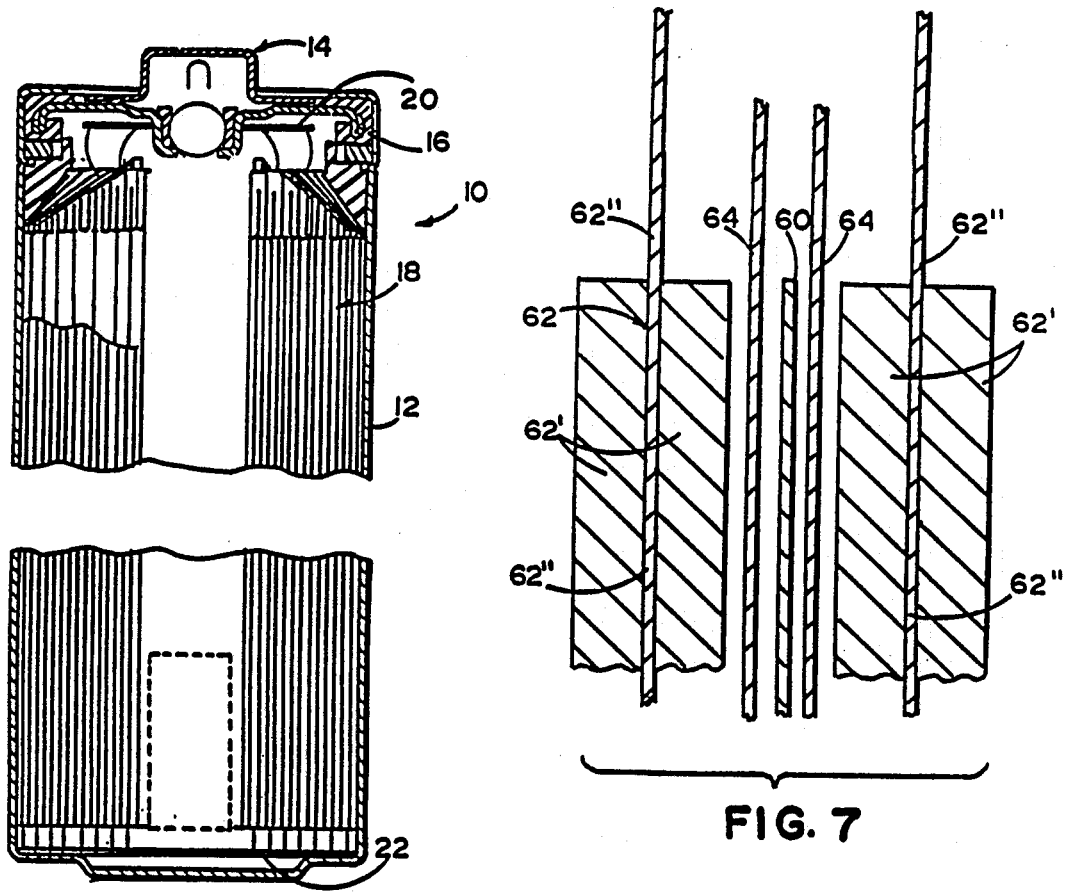
FIG. 1
FIG. 7
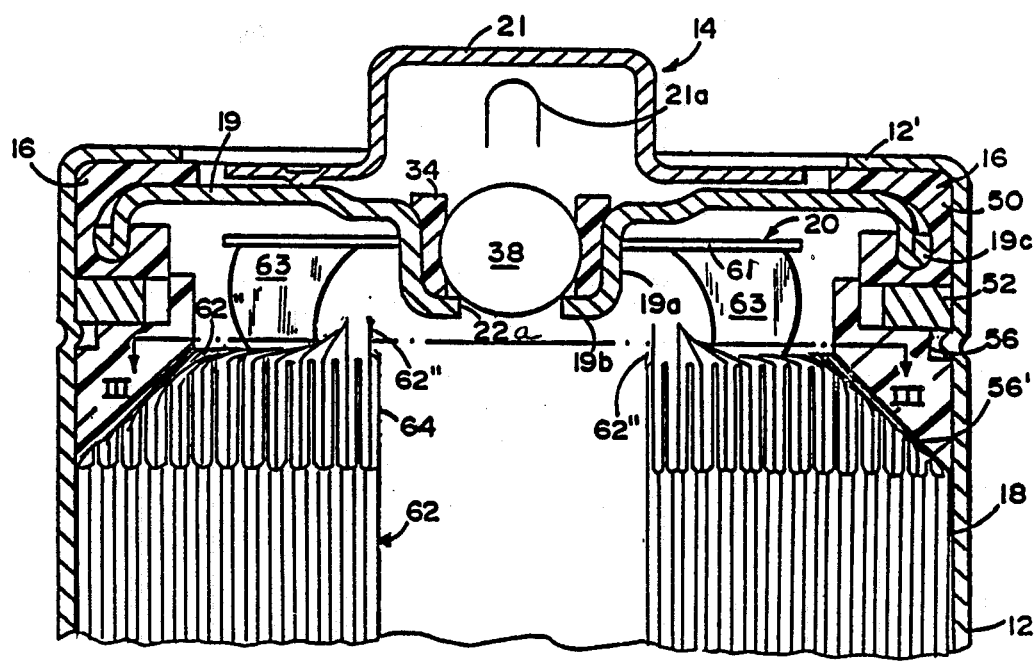
FIG. 2

INWARDLY INDENTED EDGE ELECTRODE ASSEMBLY

BACKGROUND OF THE INVENTION

This invention relates to galvanic cells having rolled or coiled electrode assemblies, i.e., so-called jelly roll electrode assemblies.

Such cells normally have at least one electrode of a layer of electrochemically active material supported on a carrier layer to form such electrode, e.g., the cathode. The carrier layer is a conductive support material, normally metal. Although some manufacturers employ carriers of expanded metal, sheet metal, or the like, the assignee herein prefers to employ a thin delicate metallic foil as the carrier so that, among other things, the thin foil carrier occupies far less space in the cell, allowing a correspondingly greater quantity of active electrode material. Although a grid carrier can be used, such a carrier is thicker, heavier and more expensive than a thin metal foil carrier and thus less volumetrically efficient in the cell. Moreover, it is desired to have the foil project axially further than the separator in the cell to be exposed as a helix of foil, so that a contact member can engage the projecting foil to make electrical contact and serve as the terminal. The use of foil, however, especially in this projecting fashion, presents real difficulties during assembly.

Specifically, battery assembly employing wound electrodes is complicated by the protruding, straight contact edges where the bare foil is exposed at the end of the roll. An insulator ring may be employed at the top of the cell to further insure electrical isolation of the exposed edges of the carrier from the cell container. The container serves as the anode terminal. Any contact at all of the foil to the container shorts the cell. Extreme difficulty has been encountered in attempting to insert the insulator ring after the rolled electrode assembly has been placed in the cell container. Therefore, this ring would normally have to be placed on the wound electrode assembly prior to its placement into the container. This is difficult. The thin carrier edges tend to buckle under pressure in an unpredictable manner. A portion of the foil can readily crumple causing it to contact the container and result in a shorted cell. This also limits allowable contact pressure of a contact spring or other contact member. Cell interior space is limited so that space for an insulator ring and other additional cell parts must be kept to a minimum. Therefore, forcing all of the elements together as is necessary increases the potential for shorting.

Previous methods of making electrical contact to exposed edges of electrode carriers in a rolled cell assembly have included the use of special slotted cross members to grip the carrier edges as disclosed in U.S. Pat. No. 3,732,124. Alternatively, the edges of a sheet metal electrode carrier have been slit and each section folded over to partially overlap the adjacent folded section as in U.S. Pat. No. 3,761,314 (see especially FIG. 3). The first technique requires exact fitting of the slotted member prior to cell sealing, a tedious and time-consuming operation. The second technique requires careful multiple slitting of the carrier edge, with the same disadvantage. Further, these folded over portions can block substantial areas of liquid access to the cell interior during electrolyte filling, thus increasing the time required to assure complete filling, and possibly blocking some electrode portions from any electrolyte contact.

The only foil backed nonaqueous solid cathode cell known to be commercially sold has been a $Li/MoS_2$ cell which employs an electrode tab welded to the pin of a glass-to-metal seal, the pin thereby serving as the terminal for that electrode. The foil edges of this cell are not exposed but are covered by a wider separator strip. This is a different type of construction.

Another manufacturer employs an expanded metal carrier, with a pressure contact to one electrode in its $Li/MnO_2$ cell, using an electrode tab on the other electrode rather than contact to exposed carrier edges. Still another manufacturer employs pressure contact to exposed electrode carrier edges at the top of its $Li/MnO_2$ cell, but using an expanded metal grid carrier which can be radially crimped toward the center without crumpling the carrier or causing shorting thereby. This cell has a plastic insulator cone at the top.

SUMMARY OF THE INVENTION

The present invention is intended to eliminate the above problems and limitations.

Protruding exposed edges of the delicate foil carrier of an electrode in a jelly roll cell are specially indented inwardly at spaced intervals to form sloped valleys and intermediate sloped ridges to prevent shorting and facilitate placement of an insulator ring, when used, at the top of the cell after insertion of the electrode in the container. It has been determined by the inventors herein that effective insulation of the exposed foil carrier edges from the container wall and good continuity of contact to the pressure contact means such as a spring contact member without shorting or damage to the thin foil edges can be achieved by radially indenting toward the axial center the axial ends of the foil edges at spaced intervals on at least a significant number of the outer turns of the foil coil. This can be readily accomplished by automatic machinery, in contrast to the meticulous cut-and-fold technique, for example, of U.S. Pat. No. 3,761,314. The inward indentations are preferably at regular intervals, e.g., in a "star" pattern, the diameter of the exposed foil carrier edges from the jelly roll being sufficiently reduced to assure no contact with the container wall, and also to assure convenient insertion of an additional plastic cone insulator. The inward folding of the thin foil edges also lends greater mechanical strength to these delicate edges to prevent them from being crushed under pressure from the contact member. Carrier edge contact is thus concentrated. The resulting structure can withstand very high contact force. Lower internal cell resistance is also promoted by the improved contact of the carrier edges in these concentrated edge zones. This special inwardly indented edge design allows for placement of the insulator ring after the jelly roll is already in the cell container, thus greatly facilitating cell assembly. Because indenting is done at intervals, openings between the foil edges in the spaces between the indentations facilitate entry of fluid electrolyte passage into all portions of the cell during filling.

These and other advantages and features of the invention will become apparent upon studying the following detailed description in conjunction with the drawings.

BRIEF DESCRIPTION OF THE DRAWINGS

FIG. 1 is a sectional elevational view of one version of a cell employing this invention;

FIG. 2 is an enlarged fragmentary sectional elevational view of the upper portion of the cell in FIG. 1;

FIG. 7 is a greatly enlarged, exploded, sectional elevational view of a portion of the jelly roll electrode assembly.

DESCRIPTION OF THE PREFERRED EMBODIMENT

Figure 3:
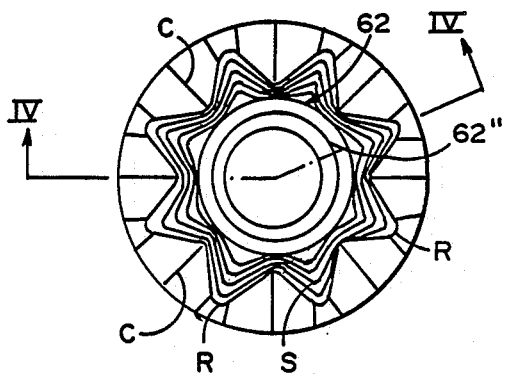
FIG. 3 is a plan view of the central components of the cell in FIG. 2, taken on plane III—III.

Referring now specifically to the drawings, the electrochemical or galvanic cell 10 there depicted includes an outer cylindrical container 12 having a cover subassembly 14 cooperatively engaged with a spring contact 20, a seal subassembly 16 within the cell, and a jelly roll electrode and separator assembly 18. The latter includes an anode, a cathode formed of an active layer on a thin metallic carrier foil, and a pair of separator sheets, all rolled into a jelly roll configuration. The cell includes a conventional bottom separator disc 22 between the bottom of the can and the roll, and an electrolyte fluid filling the space in the can and absorbed in the separator and the cathode material.

The cell is a nonaqueous electrochemical cell or galvanic cell utilizing known materials for generation of the electrochemical reaction. The cell housing is a cylindrical container or can 12 having an open upper end ultimately closed by cell cover subassembly 14. The other lower end and the peripheral wall of the container are an integral structure formed in typical fashion well-known to those in the art. The can and cover may be made from materials such as nickel and nickel alloys, steel, nickel-plated steel, tin-plated steel, stainless steel and other conductive metals and metal alloys and the like.

Cover subassembly 14 can be variously configurated and is shown as having a cover 19 and a cap 21. Cap 21 is shown to have a vent slot 21a to the ambient atmosphere. The cover has a generally planar main body section with a generally cylindrical, depressed central vent well 19a which extends downwardly into the cell. The bottom of the well has a peripheral flange 19b at the bottom center thereof, defining a central opening 22a. Contained within the well is a resilient cylindrical vent liner 34 having a central cylindrical passage therein. This passage receives by force fit a seal member 38 therein (shown here as spherical in shape). In conventional manner, this vent arrangement would allow unexpected gaseous pressure to discharge. The vent liner abuts against the planar support ledge and is preferably press fitted into the sealing well. The vent liner may be a molded polymeric resilient material such as Tefzel (trademark of E.I. DuPont & Company) or other materials such as polyethylene, polypropylene, polytetrafluoroethylene and the like. The seal member can be of a resilient or nonresilient material such as metal, glass, ceramic or polymeric materials, with at least the exterior thereof coated, if necessary, with a material chemically resistant to the components of the cell. Typical useful coating materials are polytetrafluoroethylene, fluorinated ethylene-propylene copolymer and the like. The seal member is press fitted or force fitted into the vent liner. Other vent means than that shown can also be employed.

The outer peripheral edge of the cover includes a rolled back edge 19c formed axially inwardly of the cell and then folded back upon itself to cooperate with one seal member (gasket) 50 of the seal subassembly. Cap 21 is attached to cover 19 as by weldment, covering the central portion of the cover.

The rolled back peripheral edge of the cover tightly engages annular gasket 50. This gasket is shown to rest on a support ring 52 (suitably of metal) adjacent insulating cone ring 56 which comprises an annular member of electrically insulating material having a frustoconical inner surface 56' tapered axially upwardly-radially inwardly, i.e., toward the open end of the cell. Retained around the outer periphery of the sealing well is an electrically conductive spring member 20 having an annular body 61, the downwardly protruding resilient legs 63 of which are biased against the exposed carrier foil edges of the jelly roll construction in a manner to be described more specifically hereinafter.

The outer peripheral edge of container 12 is ultimately rolled over the top of gasket 50 at 12' (FIG. 2) to retain the gasket and cover assembly intact, causing the insulator cone to be pressed tightly against the outer peripheral portion of the jelly roll upper end, and to cause spring contact 20 to tightly engage the exposed metallic carrier foil edges. The cell is thus sealed. The gasket may be of any conventional material for this purpose, e.g., a resilient polymer.

The anode and cathode can be formed of various materials. A preferred anode is flexible lithium foil capable of being rolled into the jelly roll configuration. Its thickness is typically four to ten mils, preferably six mils. Alternative anode materials can be employed. The anode is of a consumable metal such as an alkaline metal or alkaline earth metal or an alloy thereof or an intermetallic compound thereof such as lithium monoaluminide, or a solid solution such as lithium-magnesium. Sodium, potassium and lithium are preferred, with lithium being most preferred.

The cathode for the construction is a solid cathode system formed of a layer of electrochemically active substance such as iron sulfide, e.g., $FeS_2$, mixed with a conductive carbon or graphite and a binder, the mixture being sprayed or spread upon at least one surface (and preferably upon both surfaces) of a thin carrier foil of a metal such as aluminum, stainless steel, nickel or titanium. This active material is conventional technology in the art. Suitable active cathode materials include transition metal oxides and sulfides, and polycarbon fluorides. Examples of these are $FeS$, $FeS_2$, $MnO_2$, $(CF_x)_n$, $(C_2F)_n$, $V_2O_5$, $WO_3$, $MoO_3$, $MoS_2$, lead oxides, cobalt oxides, copper oxides, copper sulfides, $NiS$ and $TiS_2$. $FeS_2$ and $MnO_2$ are preferred, with $FeS_2$ being most preferred. In an $FeS_2$ or an $MnO_2$ cell, the carrier foil is typically aluminum. Alternatively, if a polycarbon fluoride active material is used, the carrier foil should be stainless steel or titanium to prevent corrosion, as is known. For aluminum and stainless steel carriers, nonannealed, i.e., full hard, materials are preferred. Binders typically used include polymers such as ethylene-propylene copolymer or polytetrafluoroethylene.

The delicate carrier foil has a thickness in the range of 0.5 mil to 3 mils, i.e., 0.0005–0.003 inch. It is preferably 1 mil (0.001 inch) if the foil is nonperforated. If desired, the foil may have perforations where the foil contacts the active cathode material. Slightly greater thickness, e.g., 2-3 mils, is considered desirable for such perforated foil. These are readily crushable. Such thin materials enable a great deal of active material to be employed, adding to the cell capacity. But they will readily deform so that assembly of the cell has been impractical where contact to exposed carrier edges is to be made. The active cathode material layer is usually about 5-15 mils thick, i.e., 0.005 to 0.015 inch thickness, preferably about 7 mils (0.007 inch). A thickness greater than this can result in difficulty in forming the structure into a jelly roll and excessive flaking off of the cathode material.

A pair of separator sheets is provided. These are of conventional nonconductive material to prevent direct electrochemical action between the surfaces of the anode and cathode to cause shorting and can be in the range of 0.5-2.5 mils, preferably 1.3 mils, in thickness. Typical of these materials are non-woven polyamide, modacrylic fibers, polypropylene fibers, microporous polypropylene, microporous polyethylene, fibrous-reinforced regenerated cellulose or the like.

The metallic carrier foil 62" for the cathode is purposely of a width dimension to cause it to extend beyond one lateral edge of the cathode active material 62' and beyond the anode 60. Separator sheets 64 also extend beyond active material of the cathode and beyond the anode, but foil 62" extends beyond the separator sheets also (FIG. 2). When the materials are subsequently formed into a jelly roll configuration, the delicate metallic foil will thus protrude or extend in helical pattern when viewed axially, toward the open end of the cell, beyond the other components.

The three types of components, anode foil 60 (FIG. 7), cathode 62 with its at least one layer 62' of active material on the metallic foil carrier 62", and separator sheets 64 are then rolled into a jelly roll configuration. In FIG. 7, just two turns of the cathode and one turn of the anode are depicted in exploded form. The jelly roll assembly is fabricated in conventional fashion by combining the anode, cathode and separator materials and rolling the layers tightly together into the cylindrical configuration of a dimension small enough to be slid into the open container prior to attachment of the cover and other components just described. Prior to inserting the roll, a suitable separator disc 22 of electrically nonconductive material is placed in the bottom of the can. It is of a material suitable for such use as known to those in the art, e.g. like the material of the separator sheets described above.

After the components are formed into a jelly roll configuration, the roll may be inserted into the open upper end of container 12 until it rests upon the bottom disc separator 22. When so placed, electrical contact between the outermost turn of the anode and the inner wall of the container is made in conventional fashion as by having a conductive tab, which is secured to the anode, extend from the end of the jelly roll and be pressed against the can wall. The axial end having the exposed carrier foil is placed in the container last to be toward the open end of the can.

The special indentation step for the foil may be performed before the jelly roll is placed in the container or after it is placed in the container. The former is presently preferred, at least for some applications.

Figure 5:
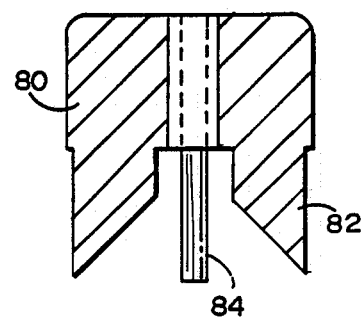
FIG. 5 is a sectional elevational view of one type of forming tool for use with this invention.
Figure 4:
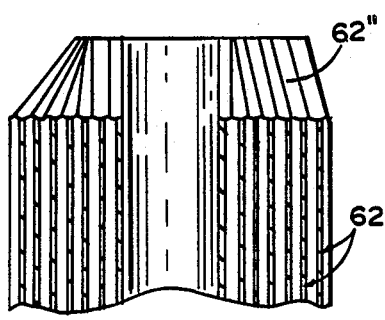
FIG. 4 is a fragmentary sectional view taken on the section cut lines IV—IV of FIG. 3.
Figure 6:
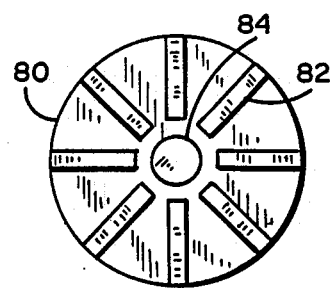
FIG. 6 is a bottom enlarged view of the device in FIG. 5.

More specifically, a multi-fold indentation pattern is formed into this protruding metallic foil, such as the eight-pointed star pattern depicted in FIG. 3, by indenting the exposed foil edges, at least those of the several outer turns of foil, radially inwardly at circumferential intervals. Although this may be done with various devices and techniques, preferably a forming device such as that depicted in FIGS. 5 and 6 is employed. That is, it is a generally cylindrical forming device 80, having a plurality of generally planar, radially and axially oriented and extending, circumferentially arranged and spaced forming blade elements 82. When the inward indentations are to be formed after the rolled electrode assembly is in the container, device 80 should have a diameter slightly smaller than the inside diameter of the container open end. Elements 82 have the inner axial end thereof tapered with the longest dimension at the radially outer edge thereof. The inner axial ends of these forming elements taper inwardly in a frustoconical fashion, the lower portions being the widest part of the frustocone, and tapering upwardly (as depicted) toward each other so that the outer peripheral portions of the carrier foil edge will be engaged first and forced radially inwardly. These elements extend from a generally cylindrical base. Further, there preferably is a gap between the central edges of the forming elements. In this gap is shown a central, axially extending alignment pin 84. By axially pressing the forming device against the exposed, axially protruding and helically arranged edges of the metallic foil carrier, the tapered axial ends of the spaced forming elements will force at least a significant number of the spaced foil turns radially inwardly on each other, beginning with the outermost turn of foil, in a fashion to form a folded pattern which may be regular, e.g., star-like, or irregular. This radially inward indentation at spaced circumferential intervals causes deep crevasses C (FIG. 3) or valleys at said intervals and lesser sloped ridges R between the intervals. The trailing end of the foil carrier is folded into one of the crevasses also, so that it cannot contact the container wall. At these ridges, the openings or spaces S remain between the turns of the foil edges so that fluid electrolyte can readily fill the cell when poured into it.

This special deforming action prevents electrical contact between the foil edges and container 12, to prevent shorting and spoilage of the cell. It also adds strength to the foil so that the electrical contact spring can be pressed tightly against the foil. Yet it can be performed quickly, reliably and automatically, before or after the rolled electrode assembly is in the container, so that assembly of the cells can be accelerated.

Subsequent to this forming operation, the remaining components of the cell can be dependably installed. That is, the electrolyte fluid is poured in to fill the cell, insulating cone 56 having a frustoconically shaped inner surface is placed against the outer peripheral portions of turns of the foil, ring 52 is inserted, gasket 50 is inserted, cover assembly 14 is placed in engagement with gasket 50 at the rolled outer edge of the cover, while causing the connected contact spring 20, and specifically its legs 63, to tightly engage the exposed, folded over metallic carrier foil, and finally the outer peripheral end of can 12 is rolled over to form planar annular flange 12', pressing the flange of gasket 50 against the cover, to seal and secure the total assembly. The electrolyte fills the central space and the spaces between the layers, also normally causing the separator material to swell somewhat, applying additional outward pressure on the roll to assure good contact of the anode tab to the cell wall.

The electrolyte is based on a nonaqueous organic solvent made conductive by the presence of a dissolved salt. Typical organic solvents include propylene carbonate, ethylene carbonate, gamma-butyrolactone, 1,1- and 1,2-dimethoxyethane, 1,3-dioxolane and 3-methyl-2-oxazolidone, or, preferably, mixtures of two or more of these solvents.

Suitable salts include $LiBF_4$ (lithium tetrafluoroborate), $LiPF_6$ (lithium hexafluorophosphate), $LiAsF_6$ (lithium hexafluoroarsenate), $LiClO_4$ (lithium perchlorate) and $LiCF_3SO_3$ (lithium trifluoromethane sulfonate) or mixtures of these salts.

It is conceivable that certain variations in the particular preferred embodiment of the cell depicted can be made without departing from the concept presented. It is also possible that various other advantages and features of the invention will become apparent upon studying the method and article presented relative to the preferred embodiment. Hence, the invention is intended to be limited not by this illustrative example, but only by the scope of the appended claims and to the reasonably equivalent structures and methods to those defined herein.

The embodiments of the invention in which an exclusive property or privilege is claimed are defined as follows.

1. A jelly roll type electrode assembly for a galvanic cell comprising a cylindrical container, a pair of first and second electrodes and at least one separator sheet, in the form of a cylindrical wound jelly roll in said container;
   said first electrode comprising a conductive carrier foil and a layer of active electrode material supported on at least one side of said foil;
   said jelly roll assembly being retained in said container with the edges of said foil and separator sheet oriented axially therein, one of said axial foil edges being dimensioned to project axially beyond said axial separator sheet edges to be exposed in the form of a helix of several turns of foil;
   at least the outermost turns of said projecting foil edges being radially inwardly indented away from said container at spaced circumferential intervals to form spaced indentations for preventing electrical contact between said foil edges and said container and for adding strength to said foil edges for electrical contact therewith;
   openings remaining between said foil edges in the areas between said spaced intervals for ready filling of said cell with a fluid electrolyte;
   said indentations being in a regular pattern of a plurality of deep crevasses at said intervals and lesser sloped ridges between said intervals; and
   an annular insulator material engaging said ridges.

2. The jelly roll electrode assembly in claim 1 wherein said separator sheet edges extend beyond said at least one layer of active material of said first electrode and beyond said second electrode.

3. The jelly roll electrode assembly in claim 1 wherein said annular insulator material comprises a ring engaging said ridges.

4. The jelly roll electrode assembly in claim 3 wherein said foil edges are pressed onto each other, and said assembly includes a metallic spring contact member engaging said foil edges.

5. The jelly roll electrode assembly in claim 1 wherein said spaced intervals are equally spaced.

6. The jelly roll electrode assembly in claim 1 wherein said foil is nonannealed metal.

7. The jelly roll electrode assembly in claim 1 wherein said foil has a thickness between 0.5 mil and 3 mils.

8. The jelly roll electrode assembly in claim 1 wherein said foil is nonperforated.

9. The jelly roll assembly in claim 1 wherein said foil in engagement with said active material is perforated.

10. A galvanic cell comprising a cylindrical container, a jelly roll type electrode assembly in said container, a sealed cover on one end of said container, and an organic electrolyte filling said container, said electrode assembly comprising first and second electrodes and separator sheets therebetween, said first electrode comprising a conductive carrier foil and a layer of active electrode material on at least one side of said foil, said foil being dimensioned to project axially beyond said second electrode and said separator sheets to project in the form of several turns of a helix;
   at least the edges of the outermost of said turns of said projecting foil being indented radially inwardly away from said container at spaced intervals in the form of sloped valleys and intermediate ridges between said valleys, said outermost turns of foil being pushed together at said valleys and spaced at said ridges;
   an annular insulating material in engagement with said foil turns and with said container; and
   metallic contact means for engagement with said foil and restrained by said cover.

11. The cell in claim 10 wherein said annular insulating material comprises an insulating ring in engagement with said foil turns and with said container.

12. The cell in claim 10 wherein said foil has a thickness in the range of 0.5 to 3 mils.

13. The cell in claim 12 wherein said second electrode is in electrical contact with said container;
   said metallic contact means comprises a spring contact engaging said cover as well as said foil edges; and
   said cover being insulated from said container.

14. A method of assembling a jelly roll type galvanic cell comprising the steps of:
   providing an open end cylindrical container, a first electrode comprising a thin metal carrier foil with at least one active electrode material layer supported thereon, at least one separator sheet, and a sheet of a second electrode;
   causing one edge of said carrier foil to project beyond said active layer, said separator sheet and said sheet of second electrode;
   rolling said first electrode, separator and second electrode into a jelly roll in a manner to have said projecting edge of said carrier foil projecting axially beyond said active layer, separator and second electrode at one axial end of the jelly roll in the form of a helix;
   radially inwardly indenting at least the outermost turns of said axially projecting and exposed foil edges at spaced circumferential intervals in a pattern to prevent electrical contact between said foil edges and said container and to add strength to said foil for electrical contact;
   said indenting being done in a manner to form spaced crevasses, sloped ridges between the crevasses, and spaces at said ridges to receive electrolyte;
   placing an annular insulator against the radially outer portions of said foil edges following said indenting step;

placing said jelly roll into said container before or after said indenting step, with said projecting foil ridges, crevasses and spaces exposed toward said open end;

filling said container with an electrolyte;

then pressing an electrical spring contact member against said radially indented foil edges and covering and sealing said container open end.

15. The method of claim 14 wherein said foil indenting step is performed before placing said jelly roll into said container.

16. The method of claim 14 wherein said foil indenting step is performed after placing said jelly roll into said container.

17. The method of claim 14 wherein said foil has a thickness in the range of 0.5 mil to 3 mils.

18. The method of claim 17 wherein said foil is about 1 mil thick.

19. The method of claim 14 wherein said foil is perforated where it engages said active layer.

* * * * *